United States Patent [19]

Lyons

[11] Patent Number: 5,170,581
[45] Date of Patent: Dec. 15, 1992

[54] ALARMED DOWNRIGGER APPARATUS WITH ADJUSTABLE RELEASE TENSION

[76] Inventor: Terry B. Lyons, 20727 Will Scarlet La., Bend, Oreg. 97702

[21] Appl. No.: 701,522

[22] Filed: May 16, 1991

[51] Int. Cl.⁵ .............................................. A01K 91/00
[52] U.S. Cl. ...................... 43/43.12; 43/17; 43/27.4
[58] Field of Search ............... 43/43.1, 43.12, 27.4, 43/17, 17.1, 21.2; 242/106

[56] References Cited

U.S. PATENT DOCUMENTS

| | | | |
|---|---|---|---|
| 2,858,637 | 11/1958 | Stark | 43/43.12 |
| 3,937,415 | 2/1976 | Prinz | 242/106 |
| 3,974,589 | 8/1976 | Henze et al. | 43/43.12 |
| 4,050,180 | 9/1977 | King | 43/27.4 |
| 4,173,091 | 11/1979 | Emory, Jr. | 43/43.12 |
| 4,248,002 | 2/1981 | McNellis | 242/106 |
| 4,273,973 | 6/1981 | Bruins et al. | |
| 4,339,811 | 7/1982 | Bednarz et al. | |
| 4,411,395 | 10/1983 | Steffens | 43/22 |
| 4,417,414 | 11/1983 | Hood et al. | 43/43.12 |
| 4,856,224 | 8/1989 | Fincher | 43/43.12 |
| 4,932,602 | 6/1990 | Scott | |
| 4,948,083 | 8/1990 | McNaney, Jr. | 43/21.2 |

FOREIGN PATENT DOCUMENTS

1059000 12/1964 United Kingdom ................. 43/17.1

OTHER PUBLICATIONS

Luhr-Jensen brochure, 7 pages, Luhr Jensen and Sons, P.O. Bx. 297 Hood River, Oregon 97031, *The Basics of Downrigging*.

Primary Examiner—Richard K. Seidel
Assistant Examiner—James Miner
Attorney, Agent, or Firm—Klarquist, Sparkman, Campbell, Leigh & Whinston

[57] ABSTRACT

A downrigger for releasably retaining a fishing line terminated by a lure and including a fishing line retainer for releasing the fishing line when a fish strikes. An alarm may be activated in response to the release. The downrigger is configured to reflect sonar signals for indicating the depth of the fishing line retainer. The downrigger is constructed to attach rotatably and removably to a cleat on a fishing vessel. The downrigger line may be electrically conductive to transmit the alarm signal on release of the fishing line.

15 Claims, 3 Drawing Sheets

ALARMED DOWNRIGGER APPARATUS WITH ADJUSTABLE RELEASE TENSION

TECHNICAL FIELD

This invention generally relates to fishing apparatus, and more particularly to a downrigger for trolling a lure at a selected depth.

BACKGROUND AND SUMMARY OF THE INVENTION

Downriggers are used to hold a fishing line and lure at a selected water depth while trolling. A downrigger typically is mounted to a fishing vessel and includes a reel and boom to pay out a strong downrigger line having a heavy trolling weight attached at the end. The weight is lowered to a preselected depth and causes the downrigger line to hang substantially vertically from the boom even during trolling with the vessel. Attached to the downrigger line near the trolling weight is a fishing line retainer such as a release block adapted to removably receive a snap plug carried at an intermediate location on a standard fishing line suspended from the vessel. The fishing line is terminated by a lure that trails behind the release block at a fixed distance that is set before the release block is tossed into the water. When a fish strikes the lure and pulls with sufficient tension on the fishing line, the snap plug and fishing line are released from the release block and move freely through the water. The fisherman may then reel and pay the fishing line as he attempts to land the fish.

Present downriggers require that the trailing distance of the lure behind the release block be selected before the block is tossed into the water. If the trailing distance is to be adjusted afterward, the block and weight must be reeled in and raised above the water surface so that the snap plug may be released from the release block and moved to a new position on the fishing line. The release block and weight must then be lowered again to a selected depth.

The release tension on known downriggers may be selected from a limited number of values. A typical approach is used by the downrigger from Luhr Jensen and Sons, Inc. This downrigger employs a release block having multiple gaps of slightly varying width that require a different release tension for pulling the snap plug from each gap.

Present downriggers also have a delayed response between the time a fish strikes the fishing line and the fisherman's awareness of the strike. The fisherman is alerted to the strike only after the fish causes visible tension on the fishing line. For instance, if the fish swims upward after taking the lure, the fishing line is slack, and the fish has time to free itself before the hook can be set. In addition, because the only indication of the strike is the delayed bending of the rod or paying out of the line, there may be an additional delay before the fisherman can respond to a strike on an unattended line.

Present downriggers also lack means for precisely indicating the depth at which the lure is being maintained. Typical downriggers use rotation counters on the downrigger line reel to provide an estimate of the depth at which the lure is being held. This estimate is subject to error because the downrigger line does not hang perfectly straight when the fishing vessel is trolling, and because the reel pays out progressively less cable per rotation due to the decreasing effective radius of the wound cable as cable is paid out. While a school of fish may be detected by sonar at a precise depth, the lure depth is known only approximately. Consequently, an error of only several feet in the depth estimate may substantially reduce the number of strikes.

An object of the invention, therefore, is to provide an improved downrigger that overcomes the drawbacks of the prior art.

Another object of the invention is to provide a downrigger wherein the length of the trailing line between the lure and the fishing line retainer may be adjusted without raising the retainer from its depth.

Still another object of the invention is to provide a downrigger having an infinitely adjustable release tension within a given range.

Another object of the invention is to provide a downrigger having an alarm that warns immediately of a fish strike.

Yet another object of the invention is to provide a downrigger having a fishing line retainer that is detectable by a common sonar device.

The foregoing and additional objects, features and advantages of the present invention will be more readily apparent from the following detailed description which proceeds with reference to the accompanying drawings.

DETAILED DESCRIPTION OF A PREFERRED EMBODIMENT

Figure 1:
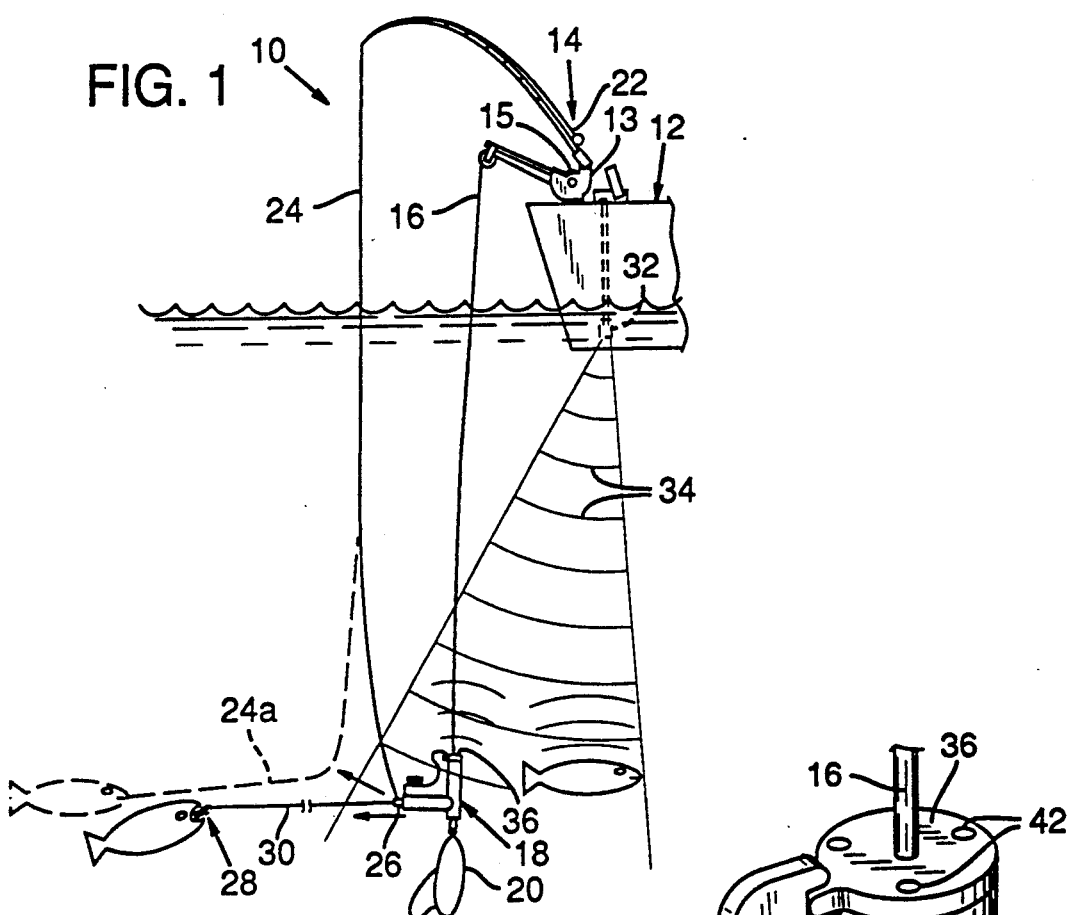
FIG. 1 is a pictorial view of a downrigger apparatus in accordance with the present invention, shown deployed on a fishing vessel.

FIG. 1 shows a downrigger apparatus 10 attached to and suspended from a fishing vessel 12. Generally speaking, apparatus 10 includes a boom and reel assembly 14 attached to the vessel 12 and comprising a body portion 13 and reel 15 journaled for rotation within the body portion. A downrigger line 16 is mounted for spooling on and off the reel 15 over the edge of the vessel and into the water to a selectable depth. In a preferred embodiment, line 16 comprises a pair of electrical conductors such as cable for forming part of an alarm circuit to be described. A line release mechanism such as fishing line retainer 18 is attached to the free end of the downrigger line 16. A trolling weight 20 of sufficient weight is attached to a lower portion of the fishing line retainer 18 to maintain the downrigger line 16 in a nearly vertical orientation while trolling.

As further shown in FIG. 1 a rod and reel 22 is received in one of the booms of assembly 14 and pays out a fishing line 24 from a free end of the fishing rod. The fishing line 24 passes freely and slidably through a line retaining member 26 on the fishing line retainer 18. The fishing line is terminated by a lure 28.

The length of trailing line portion 30 of the fishing line 24 between the lure 28 and the line retaining member 26 may be adjusted as it is retained by retainer 18 by paying out and reeling in fishing line from the rod and reel 22. The length may then be set by adjusting the line drag on reel 22. When a fish strikes the lure 28 with sufficient force, the line retaining member 26 releases the fishing line 24, permitting the fishing line 24a (shown in dashed lines) to be reeled in and the fish to be landed.

The vessel 12 may be provided with a common sonar device 32 that emits a sonar signal 34. The signal 34 is reflected off fish and other bodies and returns to the device 32. The fishing line retainer 18 includes a depth indicator such as a sonar reflecting portion 36 to permit its depth to be detected and thereby to be adjusted to the depth of a nearby school of fish as desired.

Figure 2:
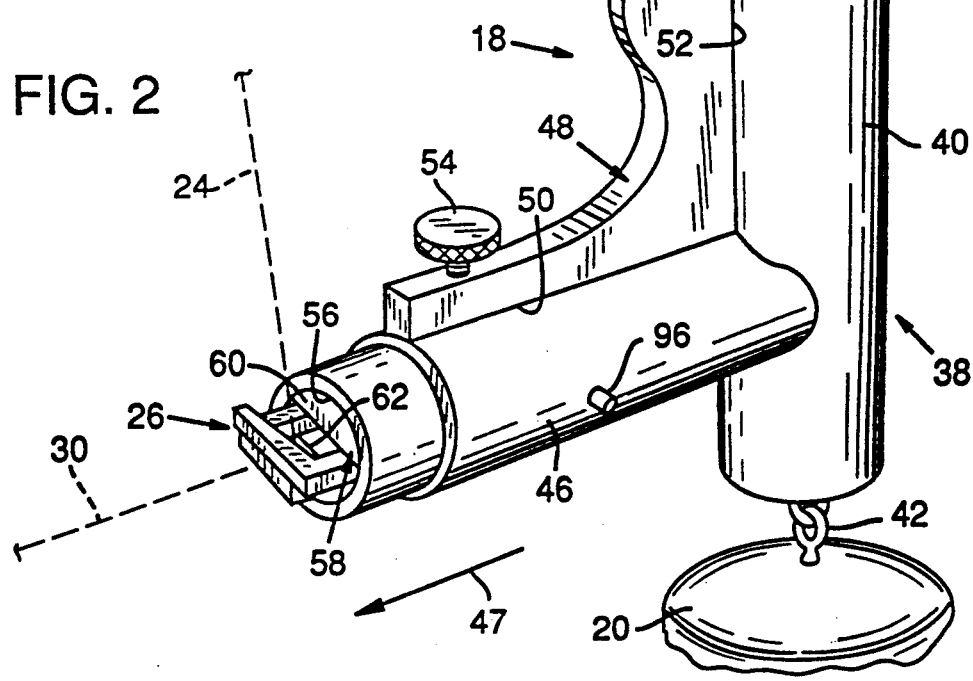
FIG. 2 is a perspective view of a fishing line retainer that is part of the downrigger apparatus of FIG. 3 is a cross sectional view of the fishing line retainer of FIG. 2 in an unreleased condition.

Referring to FIG. 2, the fishing line retainer 18 has a retainer body 38 preferably formed of non-conductive material such as molded plastic. The body has a vertically oriented cylindrical battery enclosure portion 40 enclosed at an upper end by the sonar reflecting portion 36, which is releasably attached to the battery enclosure by suitable fasteners 42. The downrigger line 16 is centrally attached to the sonar reflecting portion 36. The trolling weight 20 is attached by a swivel 42 to a lower end 44 of the battery enclosure portion 40. The retainer 18 will thereby be maintained in a vertical orientation. A sleeve portion 46 of retainer 18 is generally cylindrical and integral with the battery enclosure portion 40, extending perpendicularly from an intermediate location thereon in a trailing direction 47.

A rudder 48 is attached to generally span a space above the sleeve 46 and in the trailing direction 47 from the battery enclosure 40. The rudder 48 has a lower horizontal edge 50 attached to an upper side of the sleeve portion 46 of the body 38. A front rudder edge 52 perpendicular to the lower edge 50 is attached to the battery enclosure portion 40. The rudder 48 is generally flat and coplanar with the axes of the battery enclosure portion 40 and of the sleeve portion 46 of the body 38. An adjustment screw 54 such as a standard thumb screw is threadably received in the rudder and is oriented with its axis parallel to the axis of the battery enclosure portion 40 and perpendicularly intersecting the axis of the sleeve portion 46.

The sleeve portion 46 defines an axial cylindrical bore 56 which slidably receives a cylindrical plug 58. The plug has a trailing end 60 oriented distally from the battery enclosure portion 40 and facing the trailing direction 47. The line retaining member 26 attaches to the trailing end 60, and defines therewith an aperture 62 through which the fishing line 24 freely slides.

Figure 3:
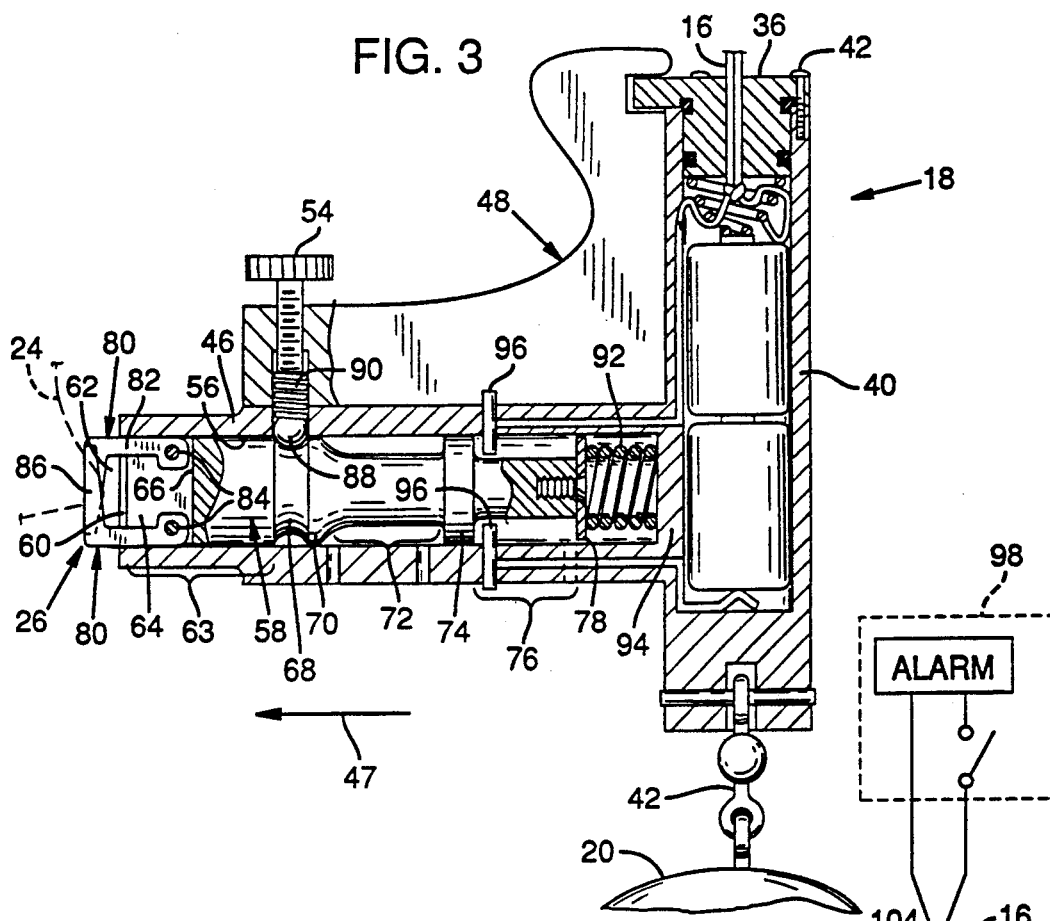

FIG. 3 shows the fishing line retainer 18 with the plug 58 in a first or closed position. The plug is fully received within the bore 56 in this position, drawing the line retaining member 26 partially within the bore and forcing it to form an enclosure to retain line 24.

Beginning at the trailing end 60 of the plug 58, the plug comprises a series of integral end-to-end coaxial cylindrical segments of varying diameters. The first segment 63 has a diameter sized to be closely received within the bore 56 of the sleeve 46. A portion of the first segment 63 nearest the trailing end defines a clip slot 64, which is cut in the plane of the plug axis and has a flat slot floor 66 which is parallel to and spaced apart from the trailing end 60.

A ball groove 68 is defined within the plug 58 adjacent to the first segment 63. The groove is a concave circumferential channel having a neck diameter less than that of the first segment 63. Adjacent to the ball groove 68 is a hill 70 having a maximum diameter greater than that of the ball groove 68 and generally equal to that of the first segment 63. Adjacent to the hill 70 is a narrowed, a generally straight elongated cylindrical segment having a diameter less than that of the ball groove 68. As can be seen in FIG. 3, the ball groove 68, the hill 70 and the narrowed segment 72 form a generally smooth and continuous cylindrical surface having curved and straight portions.

Adjacent to the narrowed segment 72 is a stop segment 74 sized to closely fit within the bore 56 to maintain the plug in coaxial relation with the sleeve. Following the stop segment 74 is a straight end segment 76 having a diameter smaller than that of the narrowed segment 72. Attached to the end segment 76 is a metallic washer 78 having a diameter slightly less than that of the bore 56.

The line retaining member 26 in the present embodiment comprises of a pair of opposed and overlapping L-shaped clips 80. The clips have straight segments 82 which are pivotally attached to spaced-apart pivot points 84 within the clip slot 64 of the plug 58. Each straight segment 82 extends from a pivot point 84 in the direction of the trailing end 60, remaining adjacent to the bore 56 of the sleeve 46 and extending out of the sleeve. Each straight segment 82 is terminated by an L-shaped segment 86 that extends perpendicularly from the straight segment 82 toward the opposite clip 80. The L-shaped segments 86 are configured to overlap so that clips 80 may pivot without interference therebetween. Together the overlapping clips 80 and the plug trailing end 60 enclose and define an aperture 62. The aperture 62 is sized to permit fishing line 24 to pass freely therethrough.

The plug 58 is retained in the closed position by a release mechanism or latch comprising in the present embodiment a ball 88 that is biased into the ball groove 68 by a ball spring 90 secured and adjustably compressed by the adjustment screw 54. The adjustment screw 54 serves as tension adjuster for compressing spring 90 to a desired force infinitely adjustable within a given range.

To bias the plug 58 outward from the sleeve 46 in the trailing direction 47, a release spring 92 is positioned between the washer 78 and an end wall 94 of the sleeve. As shown in FIG. 3, the plug 58 is retained in the closed position because the spring force of release spring 92 alone is inadequate to overcome the retaining force of ball 88 acting on the plug at groove 68. However, the adjustment screw 54 is preferably set so that only a slight tension on the fishing line 24, such as caused by a fish taking lure 28, acting with the force of spring 92 is required to overcome the force of ball 88 and release the plug 58.

Figure 4:
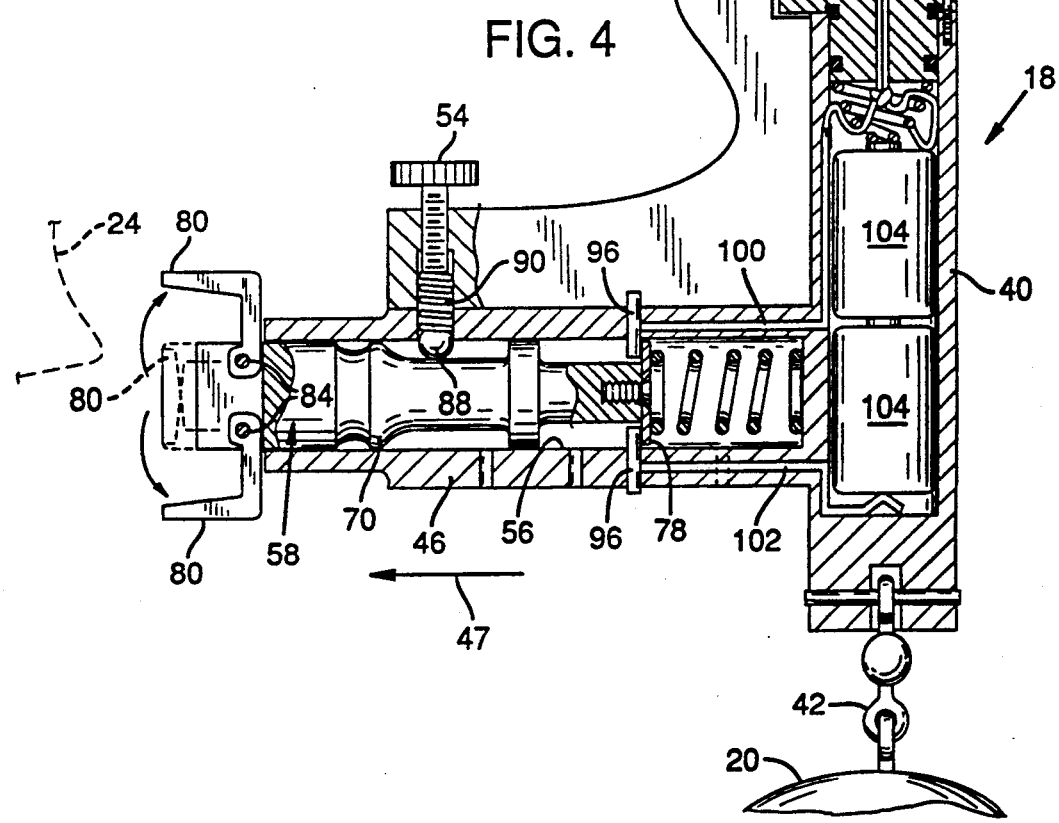
FIG. 4 is a cross sectional view of the fishing line retainer of FIG. 2 in a released condition.

FIG. 4 shows the fishing line retainer 18 with the plug 58 in the released position. This position occurs when the force of the compressed spring 92 together with additional tension on the fishing line 24 at the L-shaped clips 80 is sufficient to overcome the force of ball 88 on groove 68. Once overcome, the hill 70 passes beneath the ball 88. The ball 88 then slides freely across the narrowed segment 72 of the plug 58 as the plug slides outward from the sleeve 46 in direction 47. Even if the tension on the fishing line slackens, however, the plug does not return to the closed position because of the hill 70 and spring 92. This construction ensures that the alarm will continue once the lure is taken by the fish.

When the plug 58 is released, the L-shaped clips 80 swing outward as shown in FIG. 4, thereby permitting the fishing line 24 to be released from the line retaining member 26. A pair of metal contact pins 96 are positioned in the sleeve wall between the stop segments 74 and the washer 78 to protrude slightly into the bore 56. At release, the plug is forced by the plug spring 92 in the trailing direction 47 until the washer 78 makes contact with the contact pins 96. The pins are shown for purposes of illustration in a vertical orientation, although FIG. 2 reflects the horizontal orientation of the preferred embodiment.

Figure 5:
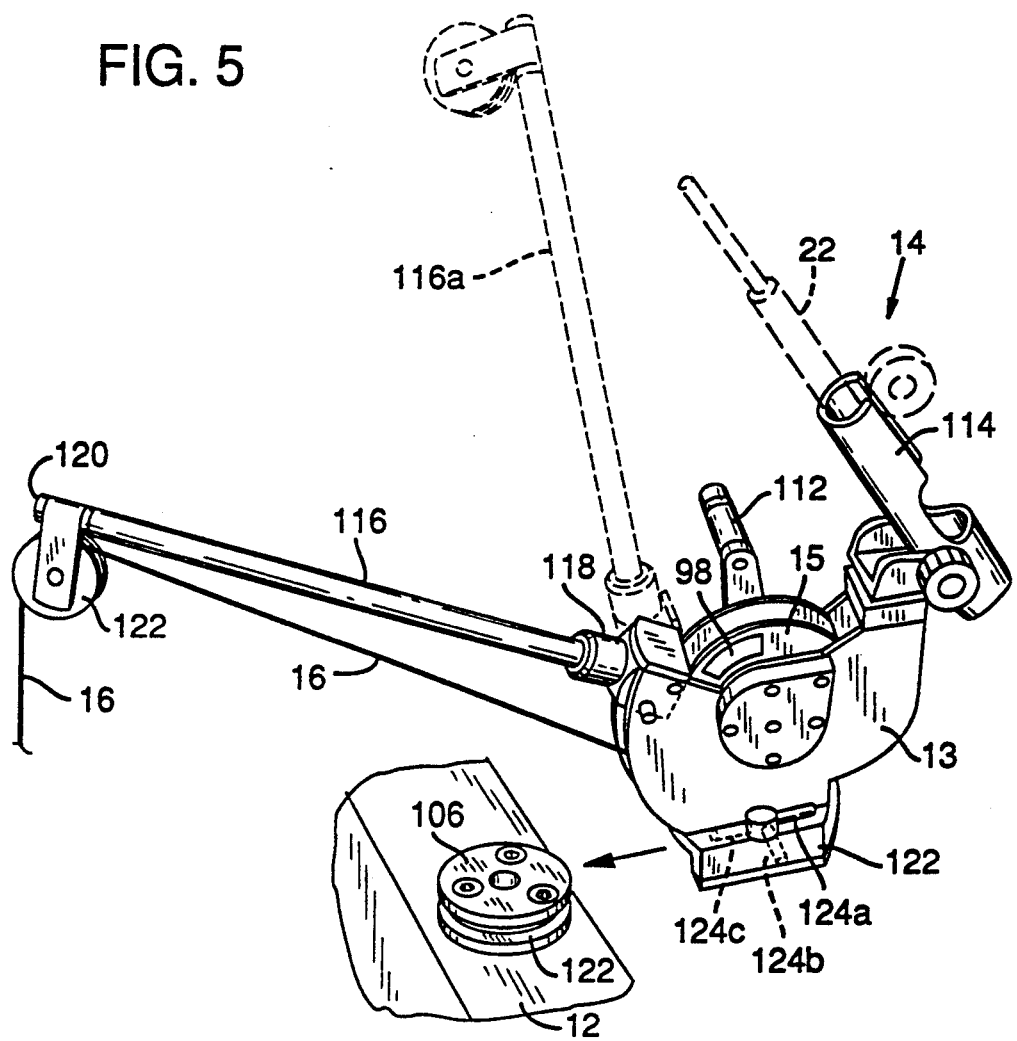
FIG. 5 is a perspective view of a boom and reel assembly that is part of the downrigger apparatus of FIG. 1.

Release of the plug 58 serves to complete an electrical circuit and send an alarm signal up the downrigger line 16 to an alarm 98. Preferably, alarm 98 is mounted adjacent to body portion 13 of apparatus 10 so that the fisherman can hear (if the warning is audio) or see (if the warning is visual) the alarm. As shown in FIG. 5, alarm 98 may be mounted within reel 15 and connected to the attached end of line 16 as part of the alarm circuit through cable 16 and alarm 98. The metal contact pins 96 are connected by respective electrical conductors 100, 102 so that contact by the washer 78 completes an alarm circuit. The circuit includes a serially connected pair of batteries 104 within the battery enclosure 40. The downrigger line 16 may be a coaxial cable, twisted wires or any suitable pair of conductors that apply the voltage of the batteries to the alarm 98 when the circuit is completed.

The sonar reflecting portion 36 is a gasketed plug within the top of the battery enclosure portion 40 to seal the enclosure, thereby maintaining the batteries in a dry condition during underwater use of the device. The sonar reflecting portion 36 may include an extended flat top surface 104 to provide improved sonar reflection and also preferably includes an air cavity (not shown) to further improve its detectability.

FIG. 5 shows the boom and reel assembly 14 removed from a cylindrical cleat 106 mounted on the surface of the vessel 12. The boom and reel assembly 14 includes the body portion 13 with the reel 15 journaled for rotation therein in response to the turning of a crank 112. The crank and reel may be engaged by a suitable, standard clutch mechanism (not shown) to permit engagement and disengagement as desired. A rod holder 114 is adapted to hold a rod and reel 22 in adjustable relation to the body portion 13. A boom 116 is pivotally attached to the body 13 at a first end 118 so that it may be raised into an upright position 116a to retract it from its extended position, for storage or transport. The boom is terminated at a second end 120 opposite the first end by a pulley block 122. The downrigger line 16 passes over the pulley block and is taken up by the reel 13.

The first end 118 of the boom 116 is configured to contact the reel 13 as the boom is raised to the upright position 116a. Consequently, the boom may be used as a brake to slow or stop rotation of the reel.

The cleat 106 is a generally flat circular puck having a circumferential groove 121 centrally defined about its periphery. The body portion 13 of the boom and reel assembly 14 includes a connector base 122 configured to receive the cleat 106. A multi-positionable fastener such as a cam lever 124 is journaled in the base to select between three positions: 124a, permitting the base 122 to be mounted on and removed from the cleat; 124b, rotatably securing the base to the cleat and permitting complete rotation thereon; and 124c, locking the base to the cleat in a fixed orientation.

Figure 6:
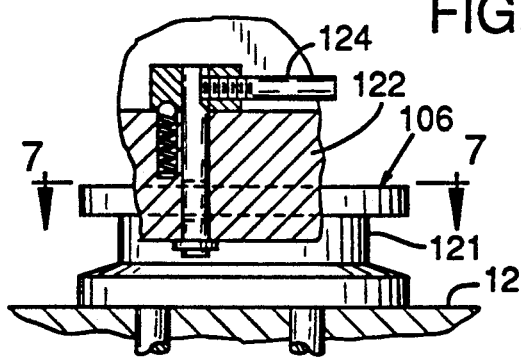
FIG. 6 is a side view, partly in section, of a connector base of the boom and reel assembly of FIG. 5 and cleat to which the connector mounts.

FIG. 6 shows a sectional portion of the connector base 122 attached to the cleat 106 and illustrates the cam lever 124 in a position allowing insertion or removal of the connector base.

Figure 7:
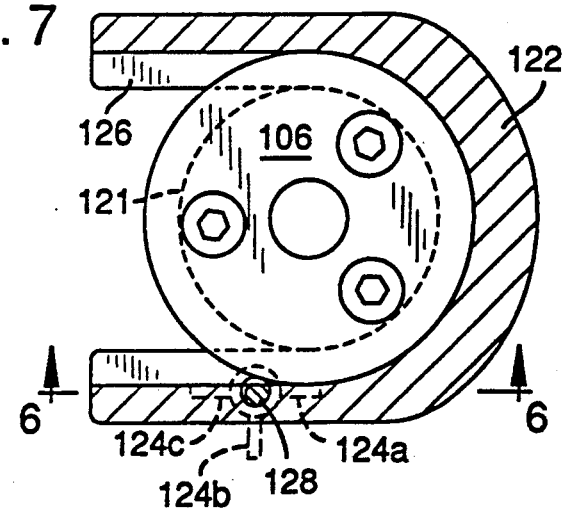
FIG. 7 is a sectional top view of the connector portion taken along line 7—7 of FIG. 6.

FIG. 7 shows a sectional view of the base 122 engaging the cleat 106. The base has a U-shaped flange 126 sized to be received by the circumferential groove 121 of the cam. The cam lever 124 is connected to a rotary cam 128 that does not protrude from the base 122 when the cam lever is in position 124a, thereby allowing the base to be removed from and mounted on the cleat 106. Rotation of the cam lever 124 clockwise by 90° into position 124b causes the cam to partially protrude from the body 13 into groove 121 to prevent removal of the base 122 from the cleat 10 while permitting free rotation of the base about the cleat. A further 90° clockwise rotation of the cam lever to position 124c causes cam 128 to firmly press against cam 106 and thereby serves lock the body 122 to the cleat 106 with any selectable orientation.

Having described and illustrated the principles of the contemplated invention with reference to a preferred embodiment it should be apparent to those skilled in the art that the invention can be modified in arrangement and detail without departing from such principles. For example, a radio link may be employed in place of a conductor in the alarm circuit. I claim all such modifications coming within the scope and spirit of the following claims.

I claim:

1. A fishing line retainer for holding at a desired depth a fishing line terminated with a lure, comprising:
   a fishing retaining member attached to the desired length;
   a fishing line retaining member attached to the retainer body for releasably retaining the fishing line such that the retaining member remains attached to the retainer body when the fishing line is released, the retaining member being constructed to allow the fishing line to be freely paid out and reeled in as it is retained for adjusting the distance between the retainer and the lure,
   a release mechanism operably connected to the line retaining member for preventing the retaining member from releasing the fishing line until a preselected tension is placed on the fishing line by a pulling on the lure,
   the body comprising a sleeve defining a bore and a plug mounted within the sleeve and slidably between a closed position and a released position, and wherein the line retaining member is attached to the plug such that the fishing line is retained by the line retaining member with the plug in the closed position and the fishing line is released by the line retaining member with the plug in the released position, the release mechanism comprising a latch attached to the sleeve for releasably holding the plug in the closed position.

2. The apparatus of claim 1 wherein the line retaining member comprises a clip attached to the plug and received in the sleeve when the plug is in the closed position to retain the fishing line and movable to release the fishing line when the plug is in the released position.

3. The apparatus of claim 1 wherein the release mechanism includes a tension adjuster for adjusting the amount of tension required on the fishing line to release the fishing line from the retaining member.

4. The apparatus of claim 1 wherein the retainer body includes a depth indicator for indicating the depth of the retainer.

5. The apparatus of claim 4 wherein the depth indicator comprises a gas filled container for retaining a gas when the retainer body is submerged, the indicator being detectable by a sonar device.

6. A downrigger comprising:
a downrigger body portion;
a reel journaled for rotation within the body portion;
an electrically conductive downrigger line for carrying an electrical signal and mounted for spooling on and off the reel; and
a fishing line retainer connected to the conductive line for releasably retaining a fishing line.

7. The downrigger of claim 6 wherein the fishing line retainer comprising:
a sleeve defining a bore;
a plug received in the sleeve and slidably between a first position and a second position; and
a line retaining member attached to the plug, whereby the fishing line is retained with the plug in the first position and the fishing line is released with the plug in the second position.

8. The downrigger of claim 7 wherein the fishing line retainer includes a latch attached to the sleeve for releasably engaging the plug in the first position.

9. The downrigger of claim 6 including a depth indicator mounted to the fishing line retainer for reflecting a sonar signal.

10. The downrigger of claim 6 wherein the downrigger body portion includes a connector portion constructed for mounting the body portion to a cleat in a locked state, swivelable state, and a removable state, whereby the body portion may be mounted and secured to the cleat in any direction.

11. The downrigger of claim 6 including a boom pivotally mounted to the downrigger body portion for supporting the downrigger line, the boom pivotable between a retracted position and an extended position.

12. The downrigger of claim 6 including a rod holder pivotally mounted to the downrigger body portion for supporting a fishing pole, the rod holder pivotable between a retracted position and an extended position.

13. A downrigger for holding at a desired depth a fishing line terminated with a lure, comprising:
a downrigger body portion;
a reel journaled on the body portion for rotation;
a conductive downrigger line mounted for spooling on and off the reel;
an alarm mounted adjacent to the body portion and connected to the conductive line; and
a fishing line retainer connected to the downrigger line for releasably retaining the fishing line at the depth of retainer, the retainer constructed for allowing the fishing line to be paid out and reeled in as it is retained for adjusting the distance between the retainer and the lure, the retainer further constructed for disabling the alarm while retaining the fishing line and enabling the alarm once the fishing line is released.

14. The downrigger of claim 13 including a cleat, wherein the downrigger body portion includes a connector portion constructed for mounting the body portion to the cleat, the connector portion including a multi-positionable fastener for allowing the connector portion to be slidably mounted on the cleat, rotated about the cleat, and locked to the cleat.

15. The downrigger of claim 13 wherein the fishing line retainer includes a tension adjuster for adjusting the amount of tension required on the fishing line to release the fishing line from the retainer.

* * * * *

UNITED STATES PATENT AND TRADEMARK OFFICE
CERTIFICATE OF CORRECTION

PATENT NO. : 5,170,581

DATED : December 15, 1992

INVENTOR(S) : Terry B. Lyons

It is certified that error appears in the above-identified patent and that said Letters Patent is hereby corrected as shown below:

```
Column 2, line 33, after "of" insert --FIG. 1.--.
Column 6, line 21, "10" should read --106--.
Column 6, lines 40-41, "a fishing retaining member attached to the
                       desired length"; should read --a retainer body
                       constructed for suspension at the desired length--.
Column 6, line 56, "slidably" should read --slidable--.
Column 7, line 25, "comprising" should read --comprises--.
Column 7, line 27, "slidably" should read --slidable--.
```

Signed and Sealed this

Tenth Day of May, 1994

*Attest:*

BRUCE LEHMAN

*Attesting Officer*   *Commissioner of Patents and Trademarks*